R. RONCONI.
COLLAPSIBLE BOX.
APPLICATION FILED JUNE 5, 1908.
Reissued Apr. 6, 1909.
12,936.
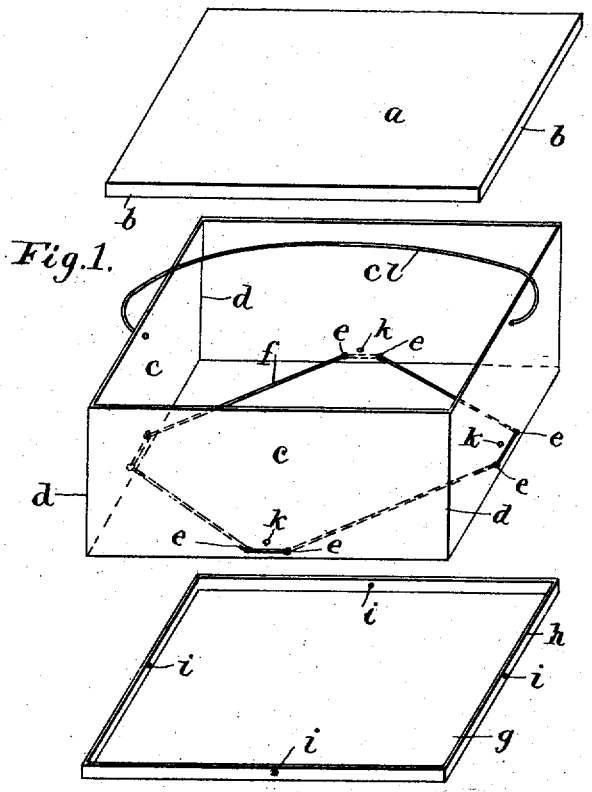
Fig.2.
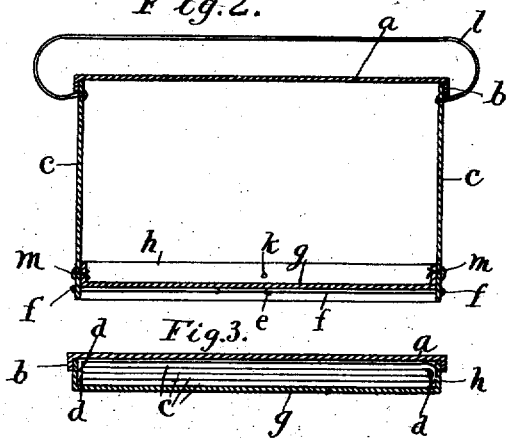
Witnesses:
Lena B. Decelle
Margaret J. Saunders
Inventor:
Romeo Ronconi
by S. W. Bates
Atty.
THE NORRIS PETERS CO., WASHINGTON, D. C.

UNITED STATES PATENT OFFICE.

ROMEO RONCONI, OF NEW YORK, N. Y., ASSIGNOR TO LYMAN H. NELSON, OF PORTLAND, MAINE.

COLLAPSIBLE BOX.

No. 12,936. Specification of Reissued Letters Patent. Reissued April 6, 1909.

Original No. 823,813, dated June 19, 1906, Serial No. 271,269. Application for reissue filed June 5, 1908. Serial No. 437,035.

*To all whom it may concern:*

Be it known that I, ROMEO RONCONI, a citizen of the United States, residing in the borough of Manhattan, in the city of New York, in the State of New York, have invented certain new and useful Improvements in Collapsible Boxes, of which the following is a specification, reference being had to the accompanying drawings, forming a part thereof.

The object of this invention is to produce a collapsible box which can be stored or carried in a small space, the sides being knocked down flat and inclosed within the shallow box-like bottom and the lid or cover and shall be firm and strong when set up, the bottom being securely held in place and the sides being held firmly, so that they cannot bulge away from the bottom.

The invention will be more fully explained hereinafter with reference to the accompanying drawings, in which it is illustrated, and in which—

Figure 1 is a view in perspective showing the lid or cover, the box sides set up, and the bottom separated one from another. Fig. 2 is a view in transverse vertical section of the box set up or assembled. Fig. 3 is a view in transverse vertical section of the box knocked down with the sides inclosed between the bottom and the cover.

The cover *a* of the box may be an ordinary shallow tray having sides *b*. The body of the box consists of four sides *c*, hinged together at the four corners *d*, so that when set up it assumes a rectangular form, as shown in Fig. 1, and when knocked down the sides fold in upon one another, as shown in Fig. 3. Near the bottom of each side are formed two holes, preferably strengthened by eyelets, as at *e*. A cord or tape *f* is threaded through the holes or eyelets *e* of the four sides of the box, extending outside of each box side *c* between the two holes *e* and extending diagonally across the corners of the box-body from one hole *e* in one side to the adjacent hole *e* in the next side. The ends of the cord or tape are spliced or tied or otherwise fastened together, so that the cord forms an endless cord and a permanent feature of the box-body.

It will be understood that when the box-body is set up, as shown in Fig. 1, the cord *f* is then stretched tightly, holding the box sides in their proper relative positions and stiffening the box-body against distortion. The diagonal portions of the cord or tape *f* also possess another function—namely, to support the box-bottom *g*, which is placed within the box-body, fitting closely therein and resting upon and wholly supported by the diagonal portions of the cord *f*. When the box-body is knocked down, the cord *f* is slackened by the act of knocking down the body, since the aggregate distance between the adjacent holes *e* in different sides of the box-body is less than when the box-body is set up. No attention to the cord or tape is therefore necessary at any time. The setting up of the box-body puts the cord under the proper tension and the knocking down of the box-body relaxes it. It will, furthermore, be observed that when the bottom *g* is in place the cord *f* holds the sides *c* of the box-body closely against the bottom, preventing the bulging out of the same when the box is packed. The box-bottom, while it might be a simple rectangular board of proper dimensions, is preferably formed as a shallow tray having low sides *h*. If the box is to be permanently set up or is to be subjected to more than ordinarily hard usage, it may be desirable to fasten the bottom in place, and for this purpose each of the shallow sides *h* of the bottom may be provided with a hole, preferably guarded by an eyelet, as at *i*, and each side *c* of the box-body may be similarly provided with a hole *k* to register with the hole *i* in the corresponding side of the bottom, and a fastening device, such as an ordinary brass paper fastener *m*, may be inserted through both holes and clenched. The box body may be further provided with a suitable fastening device, such as a cord or tape *l*, to secure the lid or cover upon the box-body when the parts are assembled.

It will be observed that the improved box is easily knocked down and set up, that no attention to the cord *f* is required, and that the box when set up is held firmly in proper position, the sides being held closely against the bottom and without the possibility of bulging away from the bottom. Furthermore, the box sides when knocked down can be inclosed between the bottom and the lid and the entire box therefore made to occupy a very small space for storage or carriage.

I claim as my invention:—

1. A collapsible box, comprising a box-body, consisting of sides, hinged together at the corners to fold in upon one another, an endless cord extending through the sides adjacent to their lower edge and at a point about midway between their hinged edges, and across the corners of the box-body near the bottom of the same, to support a bottom, said cord being under tension, and a bottom having an upturned flange, said bottom resting on the diagonal portions of the endless cord and serving as a brace for the sides of the box-body when set up, as herein set forth.

2. A collapsible box, comprising a box body, consisting of sides hinged together at the corners, to fold in upon one another, an endless cord, extending through the sides adjacent to their lower edge and at a point about midway between their hinged edges and across the corners of the box-body near the bottom of the same, to support a bottom, said cord being under tension, a bottom having an upturned flange, said bottom resting on the diagonal portions of the endless cord, and serving as a brace for the sides of the box-body with means for securing the body thereto; and a cover having a depending flange, adapted to inclose the box-body and bottom when folded, as herein set forth.

3. A collapsible paper box comprising a box body having continuous sides consisting of sections hinged together at their ends to fold one upon another, each side having two holes therein adjacent its lower edge, arranged one between each end and the center thereof, an endless cord or band extending through said holes and across the corners of the box-body to serve as a support for a bottom, said cord being under tension when the box is set up, and a bottom resting on the diagonal portions of the endless cord and serving as a brace for the sides of the box-body when set up.

This specification signed and witnessed this 22nd day of May, 1908.

ROMEO RONCONI.

In presence of—
ALPHONSE LEWIS,
LUCY LUFT.